United States Patent [19]

Collins

[11] Patent Number: 4,597,214

[45] Date of Patent: Jul. 1, 1986

[54] TRAWLING APPARATUS

[76] Inventor: Clifford W. Collins, Unit 1, Sherbrook Court, 8 Morley Street, West Tweed Heads, New South Wales 2485, Australia

[21] Appl. No.: 669,296

[22] Filed: Nov. 8, 1984

[30] Foreign Application Priority Data

Nov. 11, 1983 [AU] Australia .............................. PG2350

[51] Int. Cl.$^4$ ............................................ A01K 73/04
[52] U.S. Cl. ......................................................... 43/9
[58] Field of Search .......................... 43/9, 43.13, 42.22

[56] References Cited

U.S. PATENT DOCUMENTS 2,767,504 10/1956 Atkinson ............................. 43/43.13
3,561,150 2/1971 Silchenstedt ............................. 43/9
4,045,901 9/1977 Prudenzi .................................... 43/9

FOREIGN PATENT DOCUMENTS

82607/82 10/1982 Australia .
205670 11/1907 Fed. Rep. of Germany .
1189592 11/1959 France .
1220709 5/1960 France .
18888 4/1928 Netherlands .............................. 43/9
207177 5/1924 United Kingdom .
224128 11/1924 United Kingdom .
252492 6/1926 United Kingdom ...................... 43/9
360808 11/1931 United Kingdom .
501724 4/1976 U.S.S.R. ............................. 43/43.13
561544 6/1977 U.S.S.R. ..................................... 43/9

Primary Examiner—Gene P. Crosby
Attorney, Agent, or Firm—Schwartz, Jeffery, Schwaab, Mack, Blumenthal & Evans

[57] ABSTRACT

Trawling apparatus, including otterboards, sleds and mid-water boards (47) have transverse slats (50,54) fixed to a frame, has uprights (48) and a shoe. The apparatus is towed via a towing yoke (49) attached to a towing cable. The slats (50,54) have upright front portions (51) which define flow passages (53) therebetween. The trailing portions (52) are upwardly inclined to generate a downforce to urge the apparatus to the ocean floor. On the mid-water boards (47), the lower slats (54) have hinged trailing portions (55) which are adjustable to enable the mid-water boards (47) to be towed down to, and maintained at, a desired depth.

8 Claims, 5 Drawing Figures

TRAWLING APPARATUS

BACKGROUND OF THE INVENTION (1) Field of the Invention

This invention relates to trawling apparatus. In particular the invention relates to improvements in otterboards, sleds and mid-water boards for trawling apparatus.

(2) Prior Art

Conventional otterboards and sleds are worked to depths of 1000 meters. The major problem with the conventional otterboards is maintaining the boards on the ocean floor and so it is not uncommon to use otterboards weighing upto 650 kg. and sleds weighing upto 200 kg., both incorporating large, heavy steel shoes.

These known otterboards and sleds are difficult to handle and can only be towed at speeds below e.g. 2.2 knots or they tend to be pulled up from the ocean floor.

Many solutions to overcome the problems with known otterboards have been proposed and are disclosed in DE No. 205670; U.S. Pat. No. 2767504; GB No. 21279 (1897); GB No. 224128; GB No. 207177; FR No. 1189592 and FR No. 1220709.

None of the cited otterboards have proved successful and so trawler men have reverted to relying on weight to maintain the otterboards on the ocean floor.

SUMMARY OF THE INVENTION

It is an object of the present invention to provide an otterboard, sled and/or mid-water board where the otterboard or sled can be maintained on the ocean floor, or the mid-water board at a selected trawling depth, without the requirement for heavy weights or ballast.

It is a preferred object to provide such apparatus which can be towed at higher speeds than conventional apparatus.

It is a further preferred object to provide such apparatus which is easier to handle.

Other preferred objects of the present invention will become apparent from the following description.

In one aspect the present invention resides in trawling apparatus attachable to a trawing net including:
a frame;
first attachment means on the frame for connection to a tow line;
second attachment means on the frame for connection to the net;
a plurality of spaced slats extending laterally or longitudinally relative to the frame, each slat having a substantially vertical front portion and an inclined trailing portion; and
flow passages defined between the slats, wherein at least one of the trailing portions is upwardly inclined to generate a downward force on the apparatus.

The frame may be a peripheral frame and for an otterboard or sled, be provided with a steel shoe.

On an otterboard or mid-water board, an adjustable towing yoke may extend forwardly from the frame, with chain means being provided to adjustably set the angle of attack of the board as it is towed.

On an otterboard and sled, preferably all the trawling portions of the slats are upwardly inclined to generate the downward force. Preferably the trailing portions are inclined at an angle of 30° to 70° to the horizontal, more preferably 40° to 60°, most preferably 55°.

On the mid-water board, preferably the trailing portions of the slats above the centreline are upwardly inclined in the angle ranges hereinbefore described, the angle of 55° being most preferred. Preferably the trailing portions of the slats below the centreline are downwardly inclined at an angle equal to the angle of the trailing portions above the centreline to provide a counterbalancing upward force on the mid-water board. Preferably the angle or the trailing portion below the centreline may be reduced to enable the mid-water board to be towed down to the selected depth.

BRIEF DESCRIPTION OF THE DRAWINGS

To enable the invention to be fully understood, a number of preferred embodiments will now be described with reference to the accompanying drawings, in which.

DETAILED DESCRIPTION OF THE PREFERRED EMBODIMENTS

Figure 1:
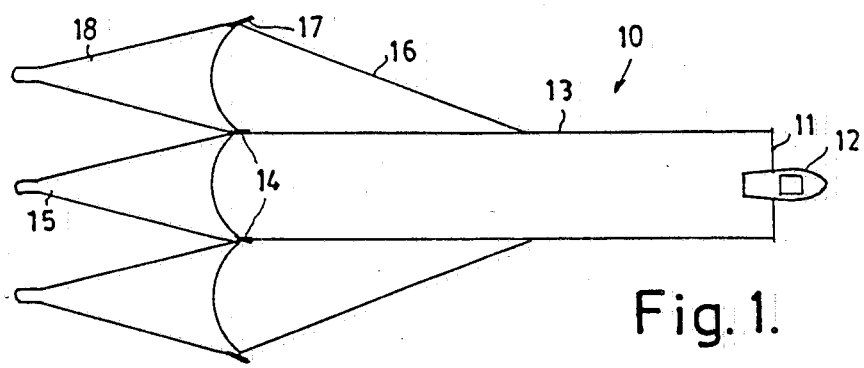
FIG. 1 is a schematic plan view of a triple-rig trawing apparatus.

Referring to FIG. 1, the triple-rig trawling apparatus 10 is towed from a pair of booms 11 extending from the trawler 12. The rig has two main bridles 13 connected to respective sleds 14 spanned by a central net 15. The side bridles 16 are connected to a respective otterboards 17 with outer nets 18 spannng the otterboards and their adjacent sleds.

Figure 2:
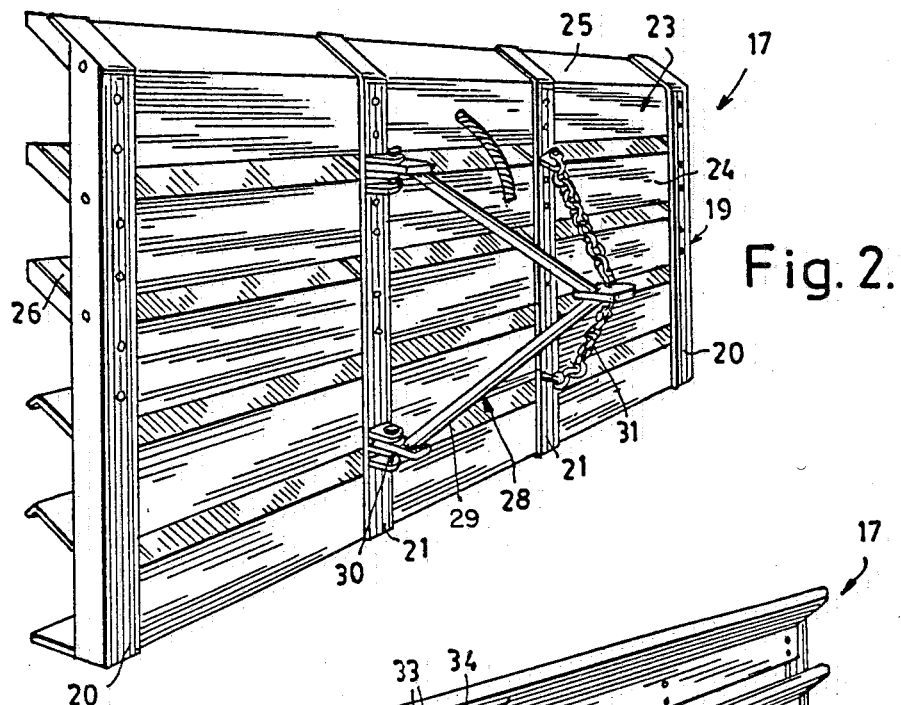
FIG. 2 is a front perspective view of an otterboard in accordance with the present invention.
Figure 3:
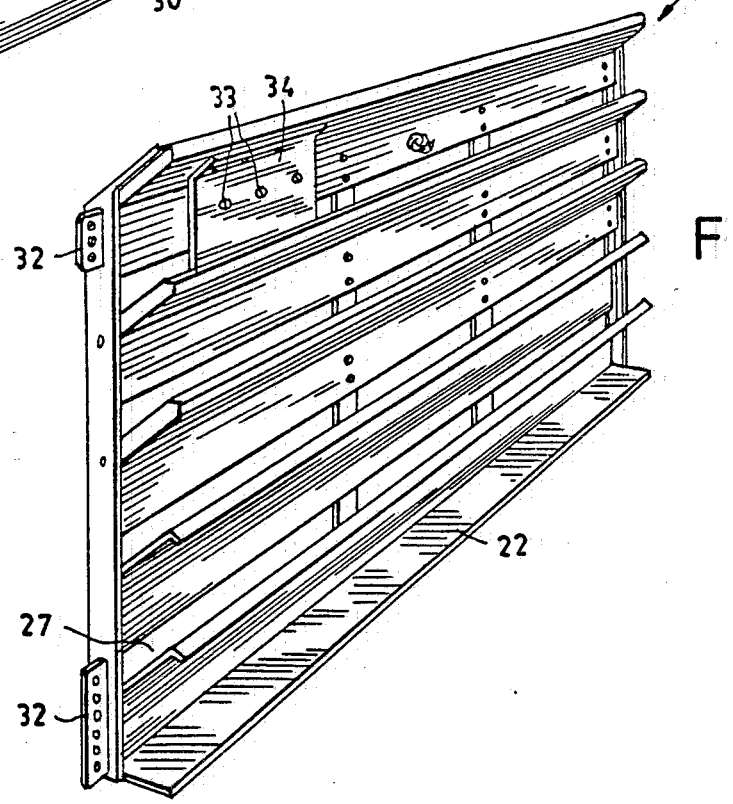
FIG. 3 is a rear perspective view of the otterboard.

Referring to FIGS. 2 and 3, each otterboard has a frame 19 comprising a pair of side uprights 20 and a pair of central uprights 21 welded to a transverse steel shoe 22.

Five slats 23 are fixed to the rear of the uprights 20, 21 and each has a vertical front portion 24 and an upwardly inclined trailing portion 25, the angle of inclination of the trailing portions being approximately 55° to horizontal. Rearwardly directed brackets 26 on the uprights 20, 21 are fixed to the trailing portion 25 to reinforce the latter.

Flow passages 27 are defined between the slats 23 and the flow passages may be 20–25 mm. deep, the front portion 24 of the slats being preferably approximately 100 mm. deep and the trailing portion 25 approximately 100 mm. wide.

A towing yoke 28, attachable to the towing cable (not shown) has its legs 29 pivotally connected to brackets 30 on one of the central uprights 21. Chains 31 attached to the other central upright 21 set the angle of the yoke 28 to the frame 19 and thereby the angle of attack of the otterboard as it is towed through the water.

The nets 18 are attached to the otterboard via cables (not shown) to brackets 32 on the adjacent side upright 20. If required, the nets may be attached to respective holes 33 in a plate 34 on the rear of the otterboard, the hole 33 selected also adjusting the angle of attack as increasing the angle allows bigger nets 18 to be used.

Figure 4:
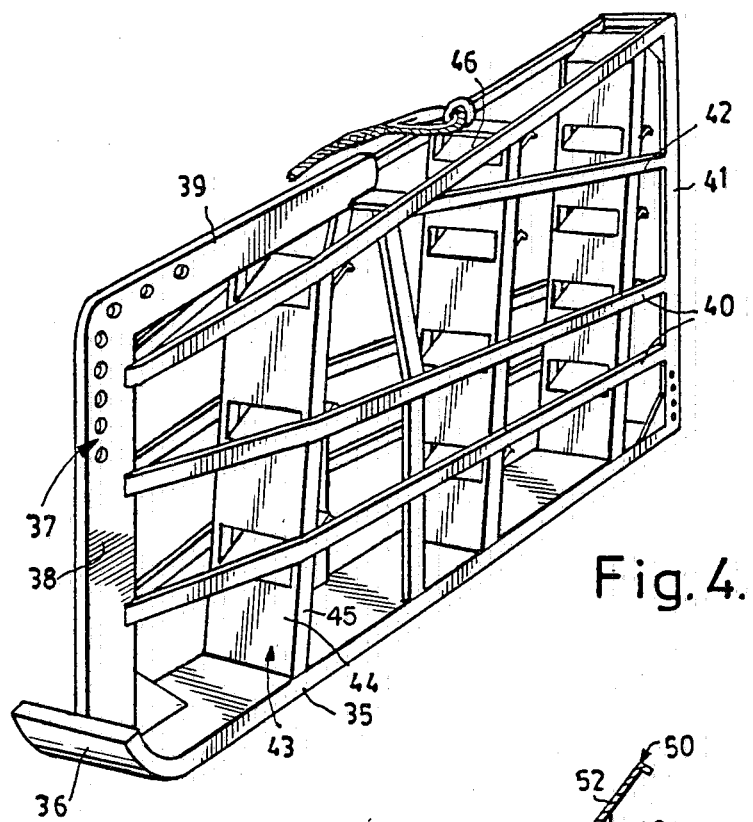
FIG. 4 is a front perspective view of a sled in accordance with the present invention.

The sled 14 of FIG. 4 has a steel shoe 35 with an upturned nose 36. An L-shaped towing plate 37 has an upright forward post 38 and rearwardly directed leg 39. Divergent side rails 40 extend rearwardly of the post 38 and are connected to an upright frame 41 at the rear of the shoe 35. Vertical and horizontal braces 42 act to stiffen the sled frame.

Three slat units 43 are mounted transversely to the sled frame and each has an upright front portion 44, inclined trailing portion 45 and flow passages 46 of similar depths to those of the otterboard 17 of FIGS. 2 and 3.

Exhaustive tests have been carried out using the triple rig 10 fitted with the otterboards 17 and sleds 14 of the present invention. Divers have observed that where conventional apparatus would ride over the hollows in the ocean floor, "bouncing" from ridge to ridge at a speed of e.g. 2.2 knots, the otterboards and sleds of the present invention would follow the contours of the floor at speeds upto 4 knots, higher speeds not yet having been tested. In certain tests, the downforce generated was so high that the otterboards and sleds ploughed through the ridges. The otterboards 17 tested weighed in the range of 75–100 kg., and the sleds 14 weighed in the range of 50–60 kg., compared with the conventional otterboards of 300 kg. plus and sleds of 150–200 kg., and the downfoce generated by the slats 23, 43 proved more effective than the additional weight of the conventional units in maintaining the otterboards 17 and sleds 14 on the ocean floor.

In one comparative test, a trawler using the otterboards and sleds of the present invention trawled immediately astern of a trawler using the conventional equipment. The prawn catch of the trawler using the equipment of the present invention was double that of the other trawler even though the other trawler had made the first trawl through the area. During the test a diver observed that the nets of the trawler using the equipment of the present invention were pulled down into the hollows which the nets of the other trawler passed over.

In a second test, one of the otterboards 17 was replaced by a conventional otterboard. Even though the sleds 14 were unchanged, the catch of the net spanning the otterboard 17 and sled 14 was nearly double the catch of the net spanning the sled 17 and the conventional otterboard. The increased trawling speed possible with the otterboards and sleds of the present invention, and the higher catch rates in the comparative tests, clearly establish that the otterboards and sleds of the present invention are superior to the conventional equipment.

Figure 5:
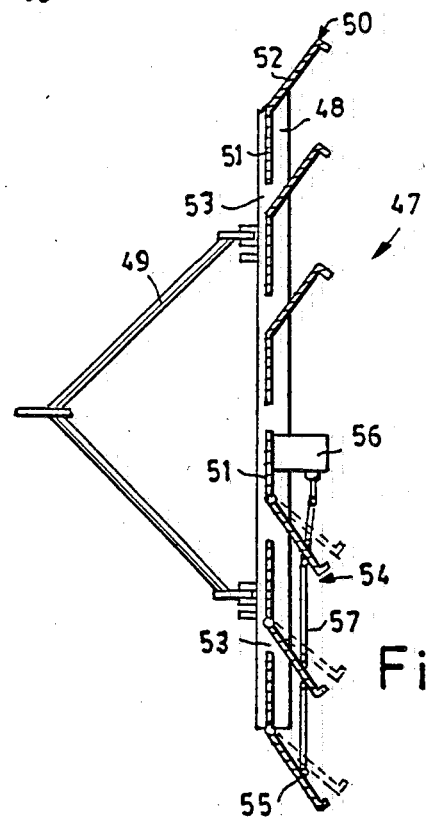
FIG. 5 is a sectional side view of a mid-water board in accordance with the present invention.

Referring now to FIG. 5, the mid-water board 47 has a frame with a plurality of uprights 48 to which is attached a towing yoke 49 and chain (not shown) similar to the corresponding components on the otterboard 17. The slats 50 above the centre line of the board 47 have upright front portions 51 with fixed upwardly inclined trailing portions 52 at a preferred angle of 55° to the horizontal. Flow passages 53 are defined between the slat 50.

The slats 54 below the centre line have front portions 51 and flow passages 53 but the trailing portions 55 are downwardly inclined and hinged to the front portions 51. A solenoid 56, powered and controlled from the trawler 12, has links 57 connected to the trailing portions 55 and adjustably vary the angle of inclinaton of the trailing portions 55 from (preferably) 55° to 40°.

When the mid-water board 47 is lowered, the trailing portions 55 are set at 40° and the reduced upward force generated by the slats 54 relative to the downward force generated by the slats 50 causes the board 47 to be towed to increasing depths. At the desired depth, the solenoid 56 is activated to increase the angle of trailing portions 55 to 55° to balance the upward and downward forces and so the mid-water board is maintained at the desired depth.

At the end of the trawl, the mid-water board is pulled in using the usual winch mechanism on the trawler 12.

It wll be readily apparent to the skilled addressee that the otterboards 17, sleds 14 and midwater board 47 of the present invention are markedly superior to their conventional counterparts.

Various changes and modifications may be made to the embodiment described without departing from the scope of the present invention as defined in the appended claims.

I claim:

1. Trawling apparatus attachable to a trawling net including:
    a frame:
    first attachment means on the frame for connection to a tow line;
    second attachment means on the frame for connection to the net;
    a plurality of spaced slats extending laterally or longitudinally relative to the frame, each slat having a substantially vertical front portion and an inclined trailing portion, said vertical front portion extending downwardly from a leading edge of said inclined trailing portion to form an extended vertical length to each said slat; and
    flow passages defined between the slats, wherein:
    at least one of the trailing portions is upwardly inclined to generate a downward force on the apparatus.

2. Trawling apparatus as claimed in claim 1 comprising an otterboard, said otterboard further including:
    a steel shoe extending along the bottom of the frame, the frame including a plurality of spaced uprights;
    each of the trailing portions of the slats being upwardly inclined.

3. Trawling apparatus as claimed in claim 2 wherein: the trailing portions are upwardly inclined at an angle of substantially 50° to the horizontal.

4. Trawling apparatus as claimed in claim 1 comprising a sled having a frame, said sled further including:
    a steel shoe having an upturned nose extending along the frame, the frame including pairs of divergent rails interconnecting a post adjacent the nose of the shoe and connected to an upright frame at the tail of the shoe; wherein:
    slats extend laterally across the frame interconnecting the pairs of rails; and
    each of the slats having trailing portions, with each of the slats being upwardly inclined.

5. A sled as claimed in claim 4 wherein:
    the trailing portions are upwardly inclined at an angle of substantially 55° to the horizontal.

6. Trawling apparatus as claimed in claim 1 comprising a mid-water board, a frame having lateral slats, said slats having
    trailing portions, the slats above a horizontal centre line of the frame being upwardly inclined and trailing portions of slats below the centre line being downwardly inclined.

7. A mid-water board as claimed in claim 6 wherein:
    the trailing portions of the slats above the centreline are inclined at an angle of substantially 55° to the horizontal; and the trailing portions of the slats below the centre line are selectively inclined at an angle of substantially 55° to the horizontal so that the upward force generated by the slats below the centreline balance the downward force generated by the slats above the centreline to be maintained at a selected towing depth, or at an angle of substantially 40° to the horizontal, so that the downward force exceeds the upward force to cause the mid-water board to be towed to an increasing towing depth.

8. Trawling apparatus as claimed in claim 1 wherein: the first attachment means and the second attachment means are adjustable to enable the angle of attchment of apparatus to be selectively adjusted.

* * * * *